(12) United States Patent
Yuenyongsgool et al.

(10) Patent No.: US 6,202,152 B1
(45) Date of Patent: Mar. 13, 2001

(54) SYSTEM AND METHOD FOR ACCESSING INFORMATION DECRYPTED IN MULTIPLE-BYTE BLOCKS

(75) Inventors: Yongyut Yuenyongsgool; David Evoy, both of Tempe; Richard Takahashi, Phoenix, all of AZ (US)

(73) Assignee: Philips Semiconductors, Inc., Tarrytown, NY (US)

( * ) Notice: Subject to any disclaimer, the term of this patent is extended or adjusted under 35 U.S.C. 154(b) by 0 days.

(21) Appl. No.: 09/014,008

(22) Filed: Jan. 27, 1998

(51) Int. Cl.[7] ...................................................... H04L 9/00
(52) U.S. Cl. ................................................................ 713/200
(58) Field of Search .................................... 713/1, 2, 200; 711/100, 204, 213

(56) References Cited

U.S. PATENT DOCUMENTS 5,825,878 * 10/1998 Takahashi et al. .......................... 380/4
5,845,066 * 12/1998 Fukuzumi .............................. 713/200

* cited by examiner

Primary Examiner—Tod R. Swann
Assistant Examiner—Matthew Smithers

(57) ABSTRACT

A system and method for accelerating information transfers from an encrypted memory to a requesting device in a system utilizing a decryption engine is provided. The decryption engine fetches and decrypts a first information block having a greater byte count than the number of bytes of requested information. A current address, corresponding to a storage device address of the decrypted first information block residing at the output of the decryption engine, is compared to a requested address. The requested address corresponds to a storage device address of a second information block of which the requested information is a subset thereof. The second information block has a byte count equivalent to the byte count of the first information block which was decrypted by the decryption engine. A new block fetch of encrypted information from the encrypted storage device is initiated when the current address and the requested address are unequal. When the current address and requested address are equal, a new block fetch is unnecessary as the requested information is accessed from the first information block currently available at the decryption engine output.

36 Claims, 5 Drawing Sheets

SYSTEM AND METHOD FOR ACCESSING INFORMATION DECRYPTED IN MULTIPLE-BYTE BLOCKS

FIELD OF THE INVENTION

The present invention relates generally to access of encrypted memory. More particularly, this invention relates to a system and method for reducing the number of memory access requests to encrypted memory where the encrypted information is decrypted in fixed-size, multiple-byte blocks.

BACKGROUND OF THE INVENTION

Cryptography, the science of keeping data secure, has expanded significantly in the private sector over the last decade. What was once almost exclusively the domain of the military is now practiced by private citizens and business entities worldwide to ensure secrecy of information and messages. Rights of privacy, business and political strategies are just a few of the many reasons why data encryption may be desired. The proliferation of computer use and global computer networks has caused the demand for secure computer practices to increase dramatically.

Various encryption techniques have resulted from the great demand for information security. Other encryption techniques have existed for quite some time, and although were originally conceived for use by the military, are used extensively by the public. Once such encryption technique is the data encryption standard (DES) which has been a worldwide standard for over 20 years. DES inputs a 64-bit block of plaintext, and outputs a 64-bit block of encrypted data using a digital key. The same algorithm that is used to encrypt the information is also used to decrypt information that was DES encrypted.

Many encryption techniques, such as DES, work as block ciphers which encrypt and decrypt data in blocks of a predetermined number of bits. For example, DES encrypts and decrypts data in 64-bit blocks which therefore requires a 64-bit input. However, there are many situations where a smaller data segment is being used. For example, where a 16-bit data segment is to be read from an encrypted memory, 64-bits are read into the DES engine to perform the decryption. This results in inefficiencies which directly affect the speed of the system.

It would be desirable for users to be able to use known encryption standards such as DES without accepting an efficiency penalty. Some prior art systems have simply accepted this penalty in accessing information of lesser byte counts than the encryption block supports. Other prior art systems have incorporated cache memories to store blocks of decrypted data. However, cache memory is complex and expensive.

The problem of fixed-size encryption/decryption algorithms is particularly evident in the context of computer power up and initialization. In less sophisticated computer systems of the past, information stored in boot ROMs (read-only memories) may have been held to a minimum. In today's computer systems, the boot ROM may involve very complicated algorithms in which information security may be desired. Encrypting the information stored in the boot ROM can provide this security, but at a cost. Because many computer systems access boot ROM information in segments much less than the 8-byte input required in decryption engines such as DES, each data segment requested results in eight bytes being fetched from the boot ROM to the decryption engine. This is very inefficient, particularly where only one or two bytes were requested at a time. If each successive boot ROM request of one or two bytes requires fetching eight bytes, the resulting inefficiency can cause significant delay during the bootstrap process.

Accordingly, there is a need for a system and method to allow utilization of encryption/decryption techniques that operate on data widths larger than the data width of the requested data, without suffering the aforementioned efficiency penalties. The present invention provides a solution to this and other shortcomings of the prior art, and offers other advantages over the prior art.

SUMMARY OF THE INVENTION

The present invention is directed to a system and method for reducing the number of memory access requests to encrypted memory where the encrypted information is decrypted in fixed-size, multiple-byte blocks having a greater number of bytes than the number of information bytes requested by each memory access request.

In accordance with one embodiment of the invention, a method for accelerating information transfers from an encrypted memory to a requesting device in a system utilizing a decryption engine is provided. The decryption engine fetches and decrypts a first information block, which is a block of information having a greater byte count than the number of bytes of requested information. A current address, which corresponds to a storage device address of the decrypted first information block residing at the output of the decryption engine, is compared to a requested address. The requested address corresponds to a storage device address of a second information block of which the requested information is a subset thereof. The second information block has a byte count equivalent to the byte count of the first information block which was decrypted by the decryption engine. A new block fetch of encrypted information from the encrypted storage device is initiated when the current address and the requested address are unequal. When the current address and requested address are equal, the requested information is accessed from the first information block currently available at the decryption engine output, which allows a new block fetch of encrypted information to obtain the requested information to be averted.

In accordance with another embodiment of the invention, a method for minimizing redundant data fetches initiated by a requesting unit to an encrypted memory is provided. The method utilizes extraneous data provided at the output of a decryption unit which operates on a fixed-byte basis. The decryption unit fetches, decrypts, and outputs fixed-byte blocks of encrypted information, where the fixed-byte blocks have a greater byte count than the byte count of the requested information. A first memory access request is issued for first requested information in response to the requesting unit. A first block of encrypted information is fetched from the encrypted memory in response to the first memory access request. The first block of encrypted information will include the first requested information and extraneous information. The extraneous information is the superfluous data which is not part of the requested data, and is provided as a result of the decryption unit operating on a fixed-byte basis which is larger than the byte size of the requested information. The first requested and the extraneous information are decrypted to provide decrypted requested information and decrypted extraneous information at the output of the decryption unit. The decrypted requested information is provided to the requesting unit. A second memory access request is issued in response to a request for second requested information from the requesting unit. At least a portion of the decrypted extraneous information—the portion that corresponds to the second requested information—is provided to the requesting unit when the second requested information is included within the decrypted extraneous information.

In accordance with another embodiment of the invention, a system for accelerating instruction execution from an encrypted memory is provided. A processor generates read requests for requested data bytes. A block decipher, i.e., decryption module, is coupled to the encrypted memory to receive the requested data bytes. The block decipher decrypts a predetermined number of input bytes to provide a decrypted data block, where the predetermined number is greater than the number of the requested data bytes. The system includes an address comparator to compare a requested address of a subsequent data byte request to a data block address corresponding to the predetermined number of input bytes which were decrypted by the block decipher. The address comparator provides a signal to enable the portion of the decrypted data block corresponding to the subsequently requested data bytes to be driven onto a data bus, if the requested address is a subset of the data block address.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

Figure 1:
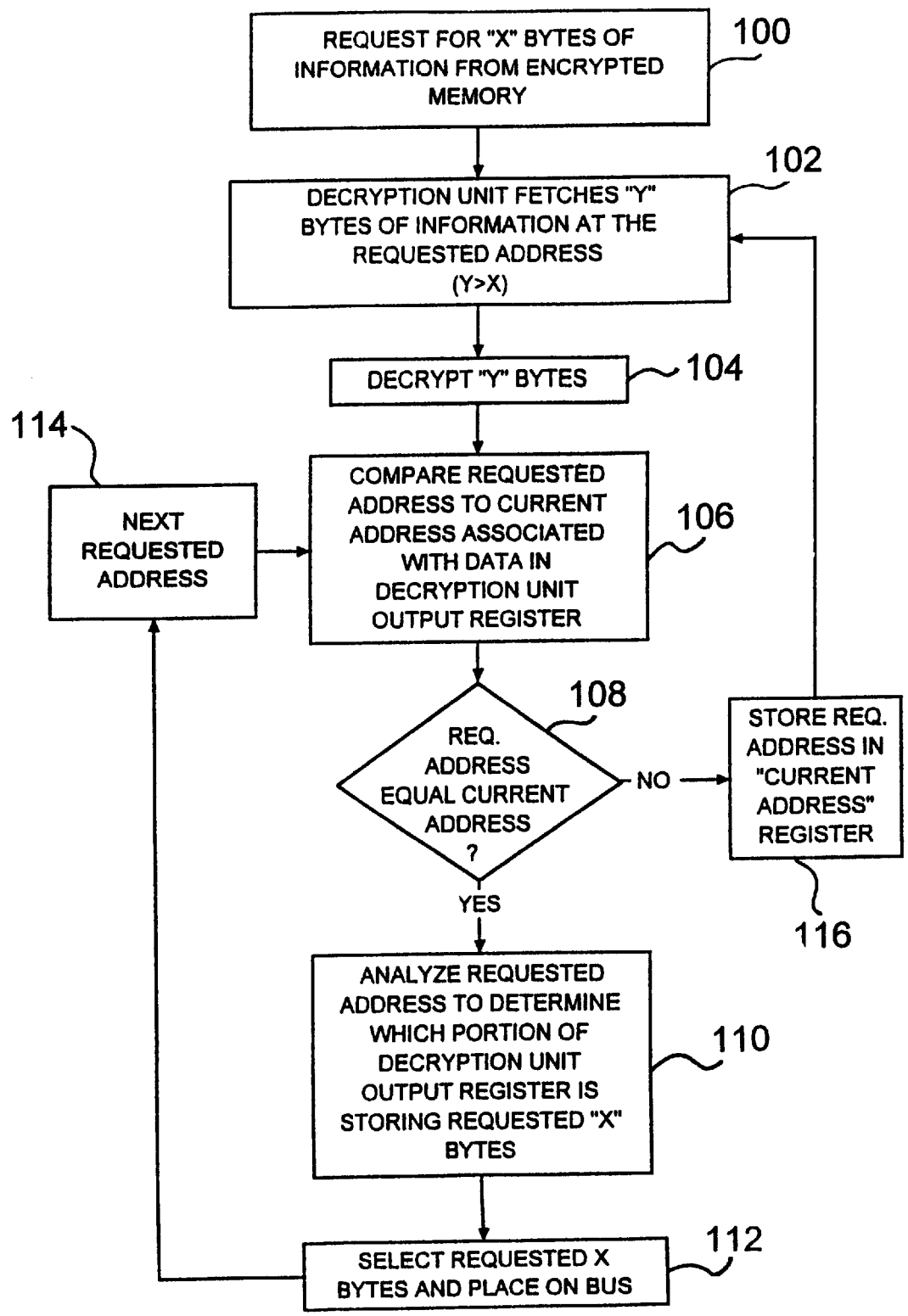
FIG. 1 is a flow diagram illustrating one embodiment of an effective utilization of excess information generated by a decryption engine in response to a memory access request to encrypted memory.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in encrypted memory applications where the requested information is decrypted in blocks of a predetermined number of bytes which is greater than the number of information bytes requested. Because many encryption/decryption engines operate on a fixed number of bytes, and because the fixed number of bytes may be greater than the number of information bytes requested in a memory access request, unnecessary memory fetches to the encrypted memory may result. The present invention provides for use of standard, fixed-byte decryption engines, yet provides a means for efficiently utilizing the excess decrypted data. This is accomplished by greatly reducing redundant memory fetching from the encrypted memory, in part due to the recognition of the principle of locality, which states that a program spends most of its time executing instructions located in a restricted address region, mainly in short loops executed many times. The same applies to data as well.

FIG. 1 is a flow diagram illustrating one embodiment of an effective utilization of excess information generated by a decryption engine in response to a memory access request to encrypted memory. A request 100 for a number of bytes (X bytes) of information is made to an encrypted memory. The number of bytes requested depends on various factors, including the number of bytes desired, and the size of the data path from the requesting device. For example, a processor with a 16-bit data path would allow only two bytes of information to be requested per memory access request.

Many decryption engines, such as the data encryption standard (DES), operate on data blocks having a fixed number of bytes. DES operates on an 8-byte block, which means that it requires eight bytes of information as its input, and produces an 8-byte decrypted output. As seen in FIG. 1, such a fixed-byte decryption unit fetches 102 a fixed number of bytes (Y bytes) of information from the encrypted memory designated by the requested address. If the decryption unit operates on a block of eight bytes, and the interface to the encrypted memory is eight bits (1 byte) wide, then eight fetches from the encrypted memory to the decryption unit would be required to provide the decryption unit with its required input. The decryption unit decrypts 104 the block of data when all Y bytes have been provided at its input, and generates a Y-byte decrypted result. Where the number of bytes requested (X) is less than the number of bytes required for the decryption unit (Y), it can be seen that extraneous decrypted data will reside at the decryption unit output register that was not requested by the X-byte request.

Although the particular memory access request may have only requested X bytes of information (e.g., 2 bytes), it is often the case that a subsequently issued memory access request will request information from the next consecutive address in the encrypted memory. For example, where the encrypted memory stores instructions for a processor having a 16-bit instruction path, consecutive memory access requests are typically to successive addresses due to the principle of locality and the sequential nature of instruction execution. Also, data stored in memory is often addressed consecutively, particularly where the data is related, such as a computer file or other data block. In these cases, it is possible that the extraneous decrypted information from a previously-decrypted memory access may include the information requested by a current memory access request. Rather than requiring the decryption unit to fetch another Y bytes of information from the encrypted memory, it would be the most efficient to determine which, if any, of the extraneous information at the decryption unit output register corresponds to the current memory access request. If so, this information can be obtained from the decryption unit output register without requiring additional fetches to the encrypted memory.

Referring again to FIG. 1, a "requested address" is compared 106 to the "current address". The current address corresponds to the initial address of the decrypted data currently residing at the decryption unit output register due to a preceding memory access request. In one embodiment of the invention, the decryption unit operates on 8-byte boundaries (e.g., bytes 0–7, 8–15, 16–23, etc.) so that the address for a memory access request for bytes 0 and 1 would be the same as the address for a memory access request for bytes 2 and 3, or 4 and 5, or 6 and 7. Therefore, if the requested address is equal to the current address as determined at decision block 108, it would indicate that the requested information is already residing in the decryption unit output register. For example, if an immediately preceding memory access request for bytes 0 and 1 was at address FFFAh, a new memory access request for bytes 2 and 3 would also be at address FFFAh because bytes 0, 1, 2 and 3 all fall within the same 8-byte block.

If the requested address is found to be equal to the current address at decision block 108, the requested address is further analyzed 110 to determine which portion of the decryption unit output register corresponds to the requested "X" bytes of information. This can be accomplished by analyzing certain ones of the requested address bits near the least significant bit of the requested address. Depending on the data width of the requested information, particular address bits will indicate which one or more of the 8 bytes of information at the decryption unit output register are targeted. This analyzation process is described more fully in connection with the description of FIGS. 4–6.

When the address has been analyzed to determine which bytes of the decryption unit output register were requested, those X bytes are selected 112 and placed on the data bus to be returned to the requesting device. The requesting device receives the requested information, and outputs another requested address 114, and the process returns to block 106 where the new requested address is again compared to the previous address. This process continues until the requested address is not equal to the current address, which indicates that the requested address is not within the Y byte boundary currently providing decrypted information at the decryption unit output register. In this case, the requested address becomes the new "current address" as shown at block 116, and processing returns to block 102 where the decryption unit fetches Y more bytes of information from the encrypted memory.

It should be noted that the decryption unit may perform initial fetch cycles prior to the first address compare so that the very first byte requested from the encrypted memory can take advantage of data available at the decryption unit output register. Similarly, the decryption unit can fetch and decrypt information prior to or concurrently with a subsequent request for information from the encrypted memory. For example, in one embodiment of the invention, the information request at block 100 can proceed directly to block 106 where the requested address is compared to a current address. This occurs where fetching and decrypting takes place prior to or concurrently with a subsequent request for information from the encrypted memory.

Figure 2:
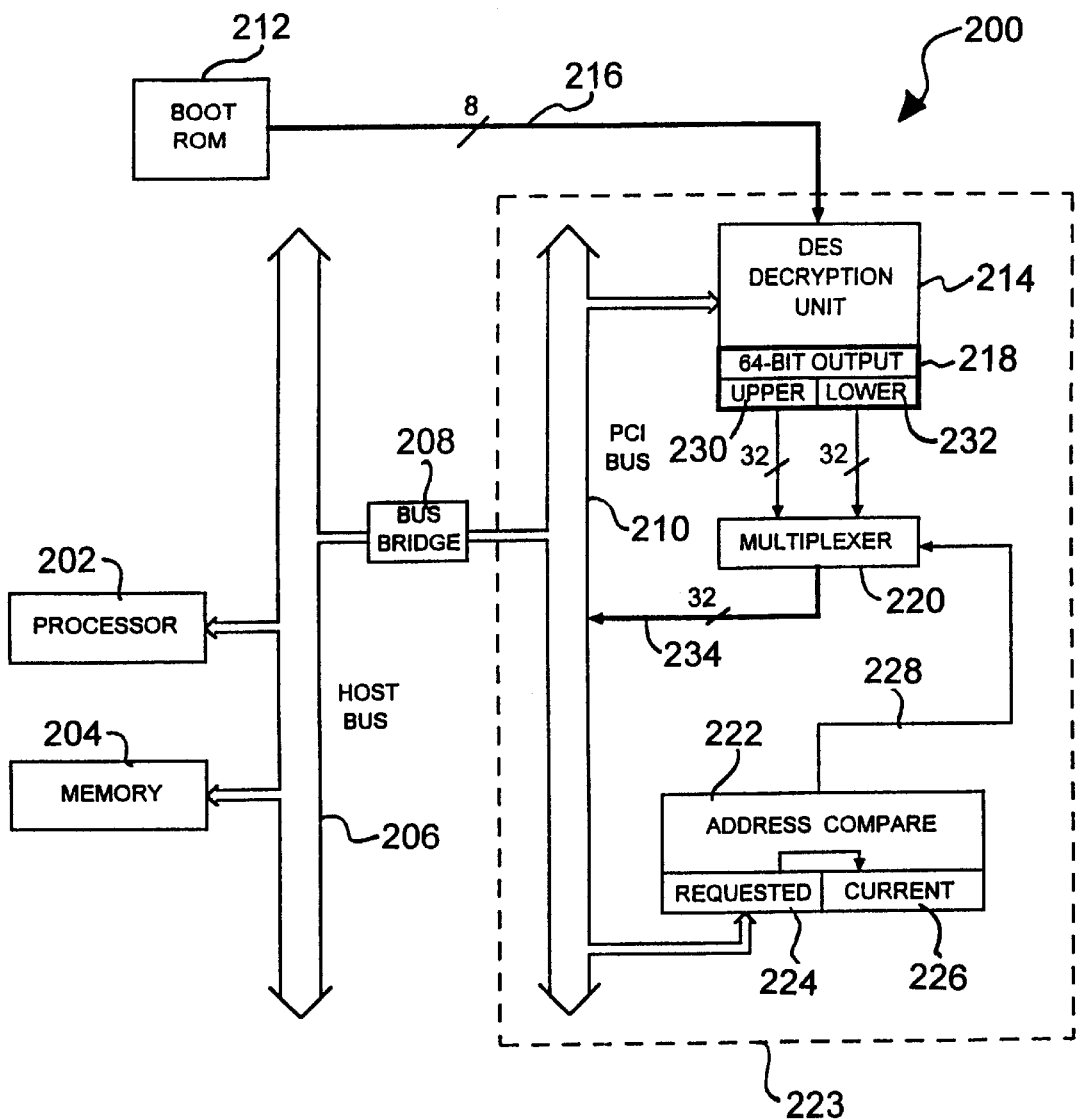
FIG. 2 is a block diagram of a computer system utilizing DES decryption to decrypt an encrypted boot ROM.

While the present invention may be applicable to many encrypted memory environments, an appreciation of the invention is best obtained in the context of FIG. 2, in which a system for utilizing the excess information generated by a decryption engine in response to a memory access request to an encrypted boot ROM is shown according to the present invention.

FIG. 2 is a block diagram of a portion of a computer system 200 that utilizes DES decryption to decrypt an encrypted boot ROM. The computer system 200 includes a processor 202 and a memory 204 which are coupled to a host bus 206. The processor 202 can initiate memory access requests, such as data read and data write requests, to memory 204 via the host bus 206. Similarly, the processor 202 can initiate access requests to components on other buses through the bus bridge 208. The bus bridge 208 provides an interface between the host bus 206 and another bus, such as the peripheral component interconnect (PCI) bus 210.

Upon power up of the computer system 200, a bootstrapping process is initiated through hardware. As is known in the art, a bootstrap is a hardware initiated procedure which invokes system programs upon power up of the system. A bootstrap program is therefore needed which copies system programs into memory and executes them. The bootstrap program itself must first somehow be loaded into memory, and in modern computers, the bootstrap program resides in read-only memory (ROM) referred to as a "boot ROM". Hardware initializes the circuitry and the first desired address location of at the boot ROM. When the fetch cycle begins, the very first instruction fetched will be the first instruction of the bootstrap program. In this manner, the bootstrap loads a system program as if it were data, copying it byte-by-byte from a storage media, and then immediately jumps to the location at which it stored the program, assuming now that it is code.

In FIG. 2, the boot ROM 212 stores the bootstrap program in encrypted form. In one embodiment of the invention, the encryption engine used to encrypt the information is a DES engine. A DES decryption unit 214 is used to decrypt the encrypted information when it is needed. In the example of FIG. 2, the boot ROM 212 is connected to the decryption unit 214 via an 8-bit interface 216. Upon power up of the computer system 200, the decryption unit 214 fetches 8 bytes from the boot ROM 212, where the decryption unit 214 is a DES engine. In one embodiment of the invention, a default fetch cycle occurs upon system power-up, so that the decryption unit 214 provides 8 bytes of decrypted information upon power-up. The decryption unit decrypts these 8 bytes and provides a 64-bit decrypted result at the decryption unit output register 218.

The processor 202 takes action using the decrypted information. However, the processor 202 may not operate on a 64-bit basis. For example, the instruction path of the processor 202 may be a 16-bit instruction path, where its program counter would increment on 2-byte increments. Therefore, six of the eight bytes decrypted by the decryption unit 214 would be extraneous. A subsequent 16-bit memory access request to the decryption unit 214 would result in another eight bytes being fetched from the boot ROM 212, which would prove to be inefficient, particularly in view of the fact that the desired information may already be present in the decryption unit's 64-bit output register 218.

The present invention provides for effective utilization of extraneously decrypted information at the output register 218. This is accomplished through the use of circuitry which analyzes the request address, and selectively allows portions of the information at the output register 218 to be driven to the PCI bus 210. This circuitry includes a multiplexing device 220 and the address compare block 222, which in one embodiment of the invention are included in a common chip 223. In one embodiment of the invention, the bus bridge 208 is incorporated into the common chip 223.

In the following example, it is assumed that the PCI bus is a 32-bit bus which includes byte enable (C/BE) signals for designating which byte lanes of the 32-bit bus will carry meaningful data during the data phase of a transaction. Therefore, because PCI logic can select from one to four bytes of a 32-bit word, only one of the two 32-bit portions of the 64-bit decrypted information at the output register 218 needs to be designated. It is to be understood that where PCI bussing is not used, appropriate modifications to the following example may be required to designate smaller portions of the 64-bit decrypted information at the output register 218. This will become apparent to those skilled in the art from the following example.

When the decryption unit 214 has decrypted eight bytes of information from the encrypted boot ROM, a 64-bit decrypted value is available at the output register 218. However, because the processor 202 may operate on a smaller instruction path (e.g., 16bits), this 64-bit value cannot be provided on the PCI bus 210. To account for this limitation, the present invention provides an address compare block 222. The address compare block 222 compares a newly "requested address" (represented at block 224) to a "current address" (represented at block 226). The current address corresponds to the address that was sent by the processor 202 that resulted in the current data in the decryption unit output register 218. If the requested address and the current address do not match, the data corresponding to the new request is not resident in the output register 218, and a new 8-byte fetch to the boot ROM will be necessary. If, however, the requested address and the current address are equal, it indicates that the new request for data is at an address encompassed by the address of the 8-byte block already decrypted.

Where the requested and current addresses match, the address compare block 222 analyzes certain bits of the requested address to determine whether the upper or lower 32-bit word of the 64-bit decrypted information at the output register 218 is being sought. The address compare block 222 outputs a signal on line 228 as a control signal to the multiplexer 220 to select either the upper portion 230 or the lower portion 232 of the output register 218 to be driven to the PCI bus 210 via interface 234. In this manner, the 32-bits which includes the data at the newly requested address can be placed on the bus without the need for additional fetches from the boot ROM.

In one embodiment of the invention, the decryption unit 214 performs fetch cycles before releasing the remaining components in the chip 223 from its power-on reset. In this manner, the address compare can be performed for the very first byte (or bytes) requested from the boot ROM 212.

Figure 3:
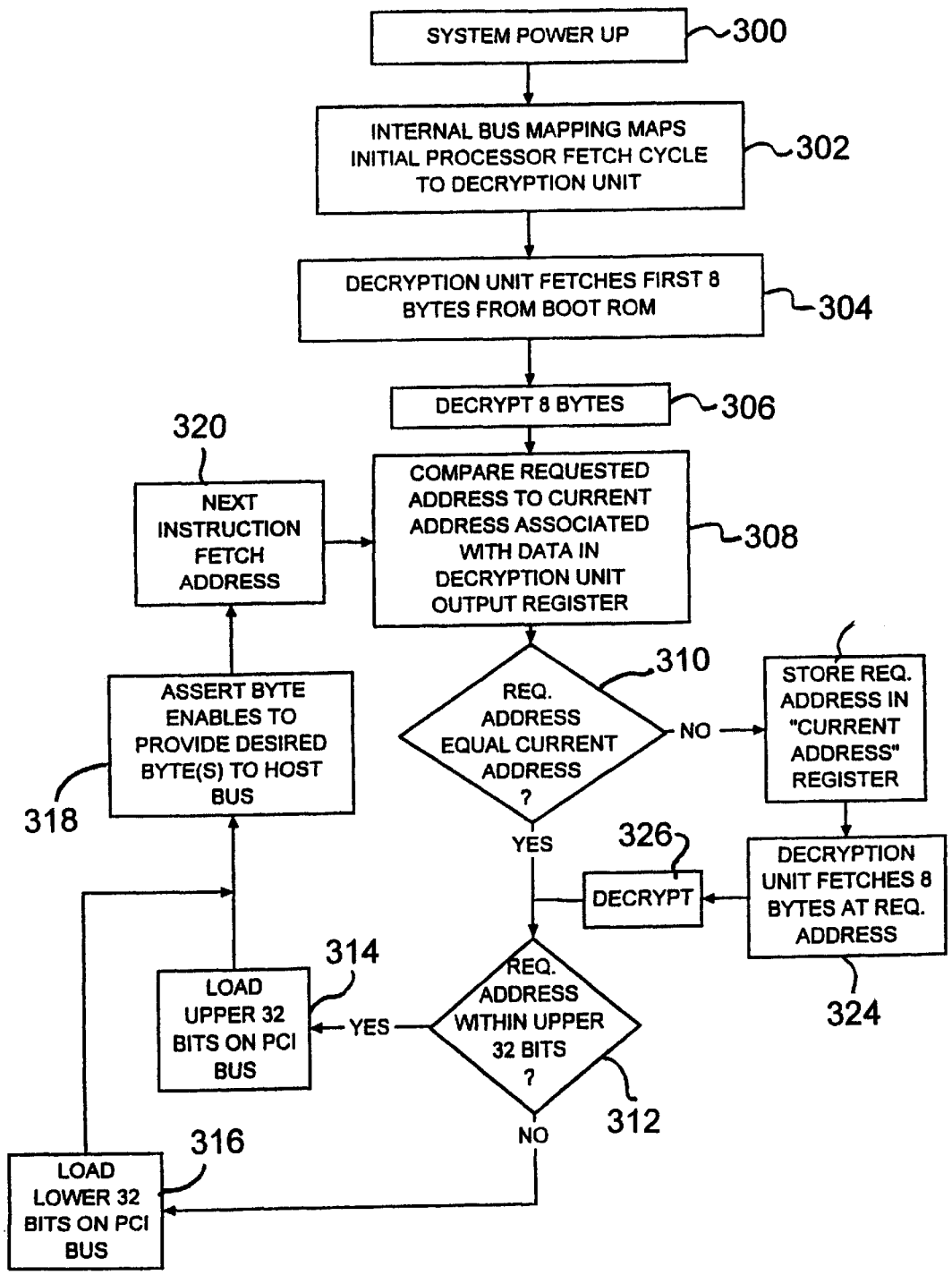
FIG. 3 is a flow diagram illustrating one embodiment of the utilization of extraneously decrypted boot ROM information in accordance with the present invention.

FIG. 3 is a flow diagram illustrating one embodiment of the utilization of extraneously decrypted boot ROM information in accordance with the present invention. When the computer system powers on 300, internal bus mapping maps the initial processor fetch cycle to the decryption unit as seen at block 302. The decryption unit responds by fetching 304 the first eight bytes from the boot ROM, where eight bytes is dictated by the requirements of a DES engine. The information is then decrypted 306 and stored in the decryption unit output register.

The next processor fetch cycle to the decryption unit will involve a new requested address. This requested address is compared 308 to the current address associated with the data in the decryption unit output register. If the requested address is equal to the current address as illustrated at block 310, it indicates that the requested information is a subset of the information that is already residing in the decryption unit output register. It is then determined 312 whether the requested address corresponds to the information in the upper or lower 32-bit block in the decryption unit output register. If it is within the upper 32-bit block, the upper 32 bits are loaded 314 onto the PCI bus. If it is not within the upper 32-bit block, it is within the lower 32-bit block, and the lower 32 bits are then loaded 316 onto the PCI bus.

As previously described, the present example assumes the use of PCI bussing. Therefore, byte enable signals are asserted 318 to indicate which one or more of the four bytes associated with the 32-bit value on the PCI bus are to be provided to the requesting processor. The processor then provides the next instruction fetch address as shown at block 320. The instruction addresses issued by the processor are likely consecutive, because the processor is attempting to execute the bootstrap program stored in the boot ROM, and notwithstanding jump and branch conditions, programs are typically executed in the order in which they are stored. Therefore, there is a good likelihood that a subsequently issued instruction address is requesting information already resident in the decryption unit output register, since it decrypts more bytes than are requested in a given instruction cycle of the processor. For this reason, the present invention is particularly useful during boot ROM decryption.

Where the requested and current addresses do not match at block 310, it indicates that the desired information is not resident in the decryption unit output register. In this case, it becomes necessary to decrypt more information from the boot ROM. At block 322, the requested address replaces the stored "current address" because the requested address will provide new decrypted information at the output register which can be used by subsequent instruction fetch cycles. The decryption unit then fetches 324 eight more bytes in accordance with the new address, decrypts 326 the information, and returns to block 312 where the appropriate 32-bit portion of the decryption unit output register is selected.

Figure 4:
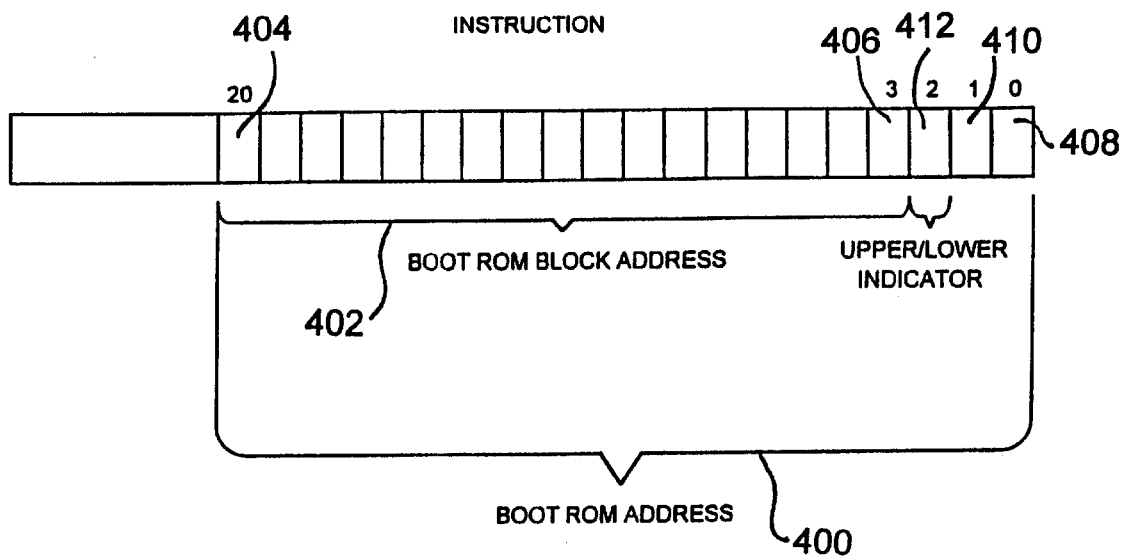
FIG. 4 is a diagram illustrating an instruction addressing scheme in accordance with the present invention.

Referring now to FIG. 4, a diagram illustrating an instruction addressing scheme in accordance with the present invention is provided. A predetermined number of bits are used to address the memory device—a boot ROM in the present example. The number of bits required is dependent on the size of the boot ROM, which in turn may depend on the quantity of information to be stored in the encrypted boot ROM. In the present example, the boot ROM address 400 consists of twenty-one bits (ADRS[20:0]). Because the decryption unit operates on 8-byte boundaries, the boot ROM block address 402 used to address a particular 8-byte block consists of eighteen bits, ranging from the most significant bit[20] 404 to bit[3] 406. As will be appreciated by those skilled in the art, disregarding the three least significant bit provides addressing on an 8-byte boundary. For example, bit[0] 408 provides an indication of which one-byte block of two bytes are identified by the address, bit[1] 410 identifies two-byte blocks, bit[2] 412 identifies four-byte blocks, and bit[3] 406 identifies eight-byte blocks. By using bit[3] 406 as the least significant bit of the boot ROM block address 402, boot ROM information can be identified on 8-byte boundaries. This is important because the decryption unit in the present example operates on 8-byte boundaries (i.e., requires 8-byte input). A decryption unit that inputs information of a different byte count would require the least significant bit of the boot ROM block address 402 to be changed accordingly.

The current address used by the address compare block 222 of FIG. 2 therefore includes eighteen bits, ranging from bit[20] 404 to bit[3] 406. Similarly, new requested addresses also include eighteen bits ranging from bit[20] 404 to bit[3]

406. When the address compare block 222 compares these two addresses, it can be determined whether the current address and the requested address target information stored in a common 8-byte block. If the addresses are not equal, then the decryption unit fetches another block of information from the encrypted boot ROM. If they are equal, then further address analyzation is required.

Where it has been determined that the current and requested addresses are equal, the requested address can be analyzed to determine which portion of the 64-bit decrypted information is sought. In the embodiment discussed in connection with FIGS. 2 and 3, a 32-bit portion was desired, because the bus enables of the PCI bus can identify which of the four bytes within a particular 32-bit portion is desired. As previously described, bit[2] 412 identifies four-byte blocks. Therefore, by analyzing bit[2] 412, it can be determined which 32-bit portion (i.e., upper or lower portion) of the information in the decryption unit output register should be provided to the PCI bus.

Figure 5:
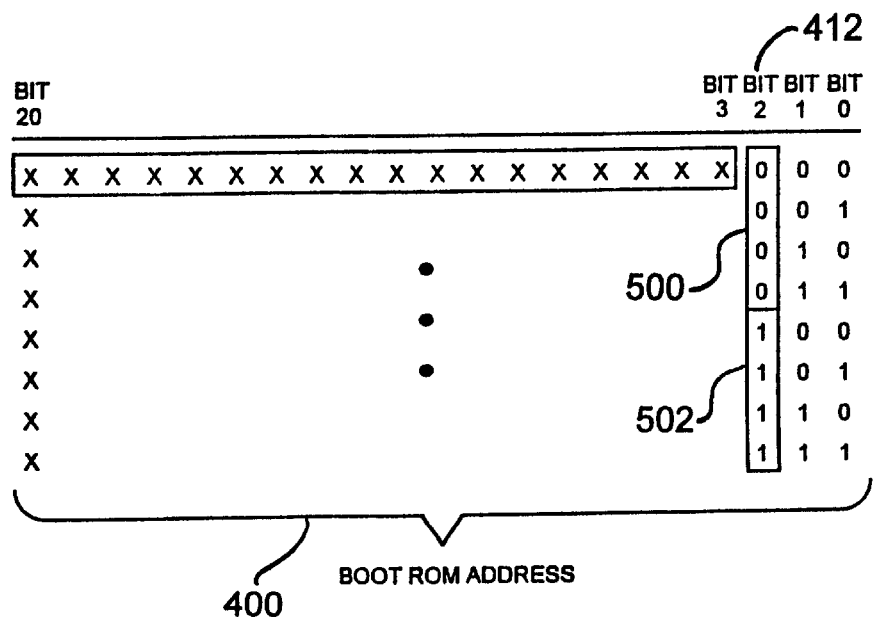
FIG. 5 illustrates the manner in which a particular requested address bit can be used to identify the desired 32-bit portion of the information in the decryption unit output register.

FIG. 5 illustrates the manner in which a particular requested address bit can be used to identify the desired 32-bit portion of the information in the decryption unit output register. The table in FIG. 5 depicts eight consecutive addresses within a particular 8-byte block. Because bit[2] 412 has a common value (0) for the first four bytes addressed as seen in block 500, and a different common value (1) for the second four bytes addressed as seen in block 502, bit[2] 412 can be used to distinguish between the upper and lower 32-bit segments of the output register. When bit[2] 412 is a first value such as "0", the boot ROM address 400 identifies one of the 32-bit portions of the decryption unit output register, which in the present example is the upper portion of the output register. When bit[2] 412 is a second value such as "1", the boot ROM address 400 identifies the other 32-bit portion of the decryption unit output register, which in the present example is the lower portion. The determination of whether the upper or the lower portion of the output register is to be selected depends on the manner in which the decryption unit provides the data to the output register. The convention adopted by DES is that the addresses having a "0" in the bit[2] location will be stored in the upper portion of the output register. As will be appreciated by those skilled in the art, a particular bit value in the bit[2] location could be used to select the opposite portion, without departing from the scope and spirit of the invention.

Figure 6:
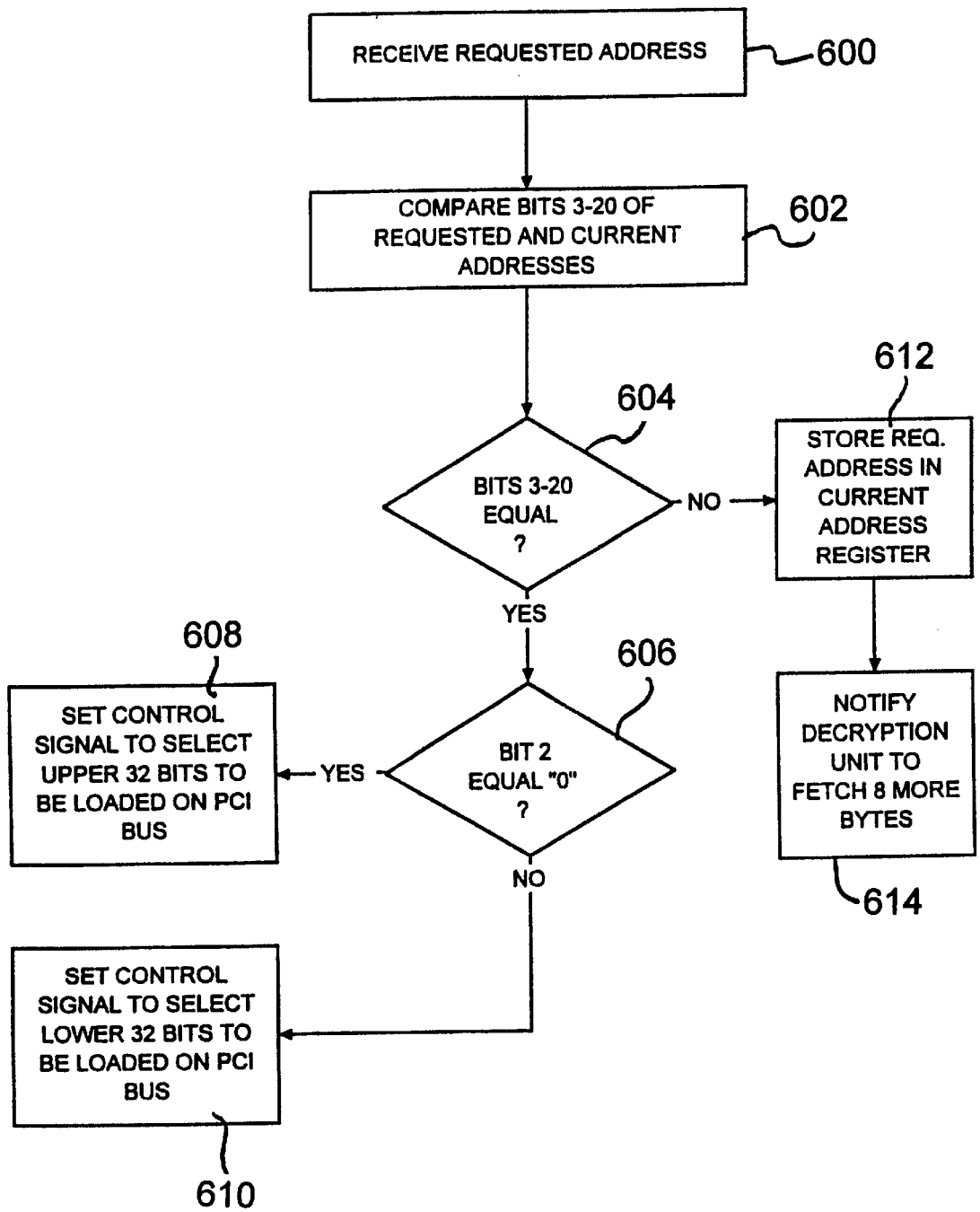
FIG. 6 is a flow diagram illustrating one embodiment of the functions performed by the address comparator.

FIG. 6 is a flow diagram illustrating one embodiment of the functions performed by the address comparator. In accordance with the previous example, the address comparator receives 600 the requested address, and compares 602 bits[20:3] of the requested and current addresses. If the corresponding bits of each of these addresses are equal as determined at decision block 604, then bit[2] is checked at decision block 606 to determine whether the requested address targets the upper or the lower 32-bit portion of the decrypted information at the decryption unit output register. If bit[2] equals "0", then the control signal to the multiplexer is set 608 to select the upper 32-bit portion for loading on the PCI bus. If bit[2] equals "1", then the control signal is set 610 to select the lower 32-bit portion for loading on the PCI bus. If the corresponding bits of the requested addresses are not equal as determined at decision block 604, the current address is updated with the requested address as shown at block 612. Thereafter, the address comparator sends a signal to the decryption unit to notify 614 the decryption unit to fetch another 8-byte block of encrypted information from the boot ROM.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for accelerating information transfers from an encrypted storage device to a requesting device in a system utilizing a decryption engine to decrypt requested information, wherein the decryption engine fetches and decrypts a first information block having a greater byte count than the number of bytes requested, comprising:

comparing a current address to a requested address, wherein the current address corresponds to a storage device address of the first information block currently available at a decryption engine output, and wherein the requested address corresponds to a storage device address of a second information block, having an equal byte count to the first information block, of which the requested information is a subset thereof;

initiating a new block fetch of encrypted information from the encrypted storage device when the current address and the requested address are unequal; and accessing the requested information from the first information block currently available at the decryption engine output when the current address and the requested address are equal, therein circumventing a new block fetch of encrypted information to obtain the requested information.

2. The method of claim 1, wherein comparing a current address to a requested address comprises comparing the storage device address of an n-byte first information block currently available at the decryption engine output to the storage device address of an n-byte second information block which includes the requested information.

3. The method of claim 1, wherein:

the decryption engine is a data encryption standard (DES) decryption engine; and comparing a current address to a requested address comprises comparing the storage device address of an 8-byte first information block currently available at the decryption engine output to the storage device address of an 8-byte second information block which includes the requested information.

4. The method of claim 1, wherein accessing the requested information comprises analyzing the requested address to determine which bytes of the second information block comprise the requested information.

5. The method of claim 4, wherein analyzing the requested address comprises comparing predetermined bits of the requested address to known bit values corresponding to addresses of information blocks which are subsets of the first information block at the decryption engine output.

6. The method of claim 5, wherein the predetermined bits of the requested address are less significant address bits than those used to address the second information block.

7. The method of claim 1, further comprising storing the current address in a storage location for future comparison to the requested address.

8. The method of claim 7, wherein initiating a new block fetch of encrypted information comprises replacing the current address in the storage location with the requested address when the current address in the storage location and the requested address are unequal.

9. The method of claim 1, wherein the encrypted storage device comprises an encrypted boot program for the decryption engine, and further including booting the decryption engine using the decryption engine to directly access, decrypt and execute the encrypted boot program without intervention by a direct memory access controller.

10. The method of claim 1, further including using the decryption engine to directly access and decrypt information from the encrypted storage device.

11. A method for minimizing redundant data fetches initiated by a requesting unit to an encrypted memory by utilizing extraneous data of a data block provided at the output of a decryption unit, wherein the decryption unit fetches, decrypts, and outputs blocks of encrypted information in data segment quantities larger than the data segment quantity of the requested information, the method comprising:

issuing, in response to the requesting unit, a first memory access request for first requested information;

fetching a first block of encrypted information from the encrypted memory in response to the first memory access request, wherein the first block of encrypted information includes the first requested information and extraneous information;

decrypting the first requested information and the extraneous information to provide decrypted requested information and decrypted extraneous information;

providing the decrypted requested information to the requesting unit;

issuing, in response to the requesting unit, a second memory access request for second requested information;

providing at least a portion of the decrypted extraneous information corresponding to the second requested information to the requesting unit when the second requested information is included within the decrypted extraneous information.

12. The method of claim 11, further comprising fetching and decrypting a second block of encrypted information, which includes the second requested information, when the second requested information is not included within the decrypted extraneous information.

13. The method of claim 12, further comprising:

comparing an address of the first block of encrypted information to an address of the second block of encrypted information to determine whether the second requested information is included within the decrypted extraneous information; and initiating the fetching of the second block of encrypted information when the address of the first block of encrypted information and the address of the second block of encrypted information are not equal.

14. The method of claim 11, further comprising comparing an address of the first block of encrypted information to an address of a second block of encrypted information which includes the second requested information, to determine whether the second requested information is included within the decrypted extraneous information; and wherein providing at least a portion of the decrypted extraneous information to the requesting unit comprises providing the portion of the decrypted extraneous information to the requesting unit when the address of the first block of encrypted information and the address of the second block of information are equal.

15. The method of claim 14, further comprising comparing at least one address bit in the address of the second information to an address of the decrypted extraneous information to determine which portion of the decrypted extraneous information corresponds to the second requested information.

16. The method of claim 15, wherein the at least one address bit is a less significant address bit than the address bits used to address the second block of encrypted information.

17. The method of claim 9, wherein the encrypted memory comprises an encrypted boot program for the decryption unit, and further including booting the decryption unit using the decryption unit to directly access, decrypt and execute the encrypted boot program without intervention by a direct memory access controller.

18. The method of claim 9, further including using the decryption engine to directly access and decrypt information from the encrypted memory.

19. A system for accelerating instruction execution from an encrypted memory; comprising:

a processor configured and arranged to generate read requests for requested data bytes;

a block decipher coupled to the encrypted memory to receive the requested data bytes, wherein the block decipher decrypts a predetermined number of input bytes greater than the number of the requested data bytes to provide a decrypted data block; and an address comparator configured and arranged to compare a requested address of subsequently requested data bytes to a data block address corresponding to the predetermined number of input bytes decrypted by the block decipher, and to enable a portion of the decrypted data block corresponding to the subsequently requested data bytes to be driven onto a data bus if the requested address is a subset of the data block address.

20. The system as in claim 19, wherein the encrypted memory comprises an encrypted boot program and wherein the block decipher directly accesses, decrypts and executes the encrypted boot program.

21. The system as in claim 19, wherein the block decipher comprises a decryption engine which decrypts a predetermined number of data bytes, and wherein the portion of the decrypted data block corresponding to the subsequently requested data bytes to be driven onto a data bus is directly accessed by the block decipher without intervention by a memory controller.

22. The system as in claim 19, wherein the block decipher comprises a data encryption standard (DES) decryption engine that directly accesses and decrypts information from the encrypted storage device.

23. The system as in claim 19, further comprising a block address storage register to store the data block address of the predetermined number of input bytes decrypted by the block decipher.

24. The system as in claim 19, wherein the address comparator comprises a comparator output to provide a byte selection signal for selecting the portion of the decrypted data block to be driven onto the data bus.

25. The system as in claim 24, further comprising a multiplexing unit to receive the byte selection signal from the comparator output, and to enable one or more bytes of the decrypted data block to be driven onto the data bus in response thereto.

26. The system as in claim 19, wherein the address comparator comprises:

a first comparator to compare the requested address of the subsequently requested data bytes to the data block address to determine whether the requested address is a subset of the data block address; and a second comparator to compare predetermined address bits of the requested address to an address of an output of the block decipher to determine which bytes of the decrypted data block are to be driven onto the data bus.

27. The system as in claim 26, further comprising a multiplexing unit coupled to receive a byte selection signal from the second comparator, and to enable one or more bytes of the decrypted data block to be driven onto the data bus in response to the byte selection signal.

28. The system as in claim 19, wherein the block decipher comprises a data encryption standard (DES) decryption engine which decrypts data in eight-byte blocks to produce an eight-byte decrypted data block, and wherein the system further comprises a multiplexing unit coupled to receive a byte selection signal from the address comparator, and to enable one or more bytes of the eight-byte decrypted data block to be driven onto the data bus in response to the byte selection signal.

29. The system as in claim 28, wherein the address comparator comprises a bit comparator to compare a predetermined address bit of the requested address to a predetermined bit value to determine, in response to the byte selection signal, which of a most significant four-byte block and a least significant four-byte block of the decrypted data block is to be driven onto the data bus.

30. The system as in claim 29, wherein the data bus comprises a peripheral component interconnect (PCI) bus coupled to the multiplexing unit to receive the driven one of the most significant four-byte block and the least significant four-byte block, and to designate one or more bytes of the driven four-byte block as the subsequently requested data bytes using PCI byte enable control.

31. A system for accelerating information transfers from an encrypted storage device to a requesting device in a system utilizing a decryption engine to decrypt requested information, wherein the decryption engine fetches and decrypts a first information block having a greater byte count than the number of bytes requested, comprising:

means for comparing a current address to a requested address, wherein the current address corresponds to a storage device address of the first information block currently available at a decryption engine output, and wherein the requested address corresponds to a storage device address of a second information block, having an equal byte count to the first information block, of which the requested information is a subset thereof;

means for initiating a new block fetch of encrypted information from the encrypted storage device when the current address and the requested address are unequal; and means for accessing the requested information from the first information block currently available at the decryption engine output when the current address and the requested address are equal, thereby circumventing a new block fetch of encrypted information to obtain the requested information.

32. The system of claim 31, wherein the encrypted storage device comprises an encrypted boot program for the decryption engine, and further including means, included in the decryption engine, for booting the decryption engine using the decryption engine to directly access, decrypt and execute the encrypted boot program without intervention by a direct memory access controller.

33. The system of claim 31, further including means, included in the decryption engine, for directly access and decrypt information from the encrypted storage device.

34. A system for minimizing redundant data fetches initiated by a requesting unit to an encrypted memory by utilizing extraneous data of a data block provided at the output of a decryption unit, wherein the decryption unit fetches, decrypts, and outputs blocks of encrypted information in data segment quantities larger than the data segment quantity of the requested information, the system comprising:

first memory access means for issuing, in response to the requesting unit, a first memory access request for first requested information;

means for fetching a first block of encrypted information from the encrypted memory in response to the first memory access request, wherein the first block of encrypted information includes the first requested information and extraneous information;

means for decrypting the first requested information and the extraneous information to provide decrypted requested information and decrypted extraneous information and for providing the decrypted requested information to the requesting unit;

second memory access means for issuing, in response to the requesting unit, a second memory access request for second requested information;

providing at least a portion of the decrypted extraneous information corresponding to the second requested information to the requesting unit when the second requested information is included within the decrypted extraneous information.

35. The system as in claim 34, wherein the first and second memory access means are implemented in an integrated logic circuit.

36. The system as in claim 34, wherein the first and second memory access means are implemented in a single processor unit.

* * * * *

UNITED STATES PATENT AND TRADEMARK OFFICE
CERTIFICATE OF CORRECTION

PATENT NO. : 6,202,152 B1
DATED : March 13, 2001
INVENTOR(S) : Yuenyongsgool et al.

It is certified that error appears in the above-identified patent and that said Letters Patent is hereby corrected as shown below:

Column 12,
Line 5, "9" should read -- 11 --.
Line 11, "9" should read -- 11 --.

Column 14,
Line 12, "access" should read -- accessing --.
Line 13, "decrypt" should read -- decrypting --.

Signed and Sealed this

Eighth Day of January, 2002

Attest:

JAMES E. ROGAN
Attesting Officer *Director of the United States Patent and Trademark Office*